C. R. HERPEL.
WHEEL SETTING MECHANISM FOR HARVESTERS.
APPLICATION FILED JUNE 4, 1912.
1,075,148.
Patented Oct. 7, 1913.
2 SHEETS—SHEET 1.
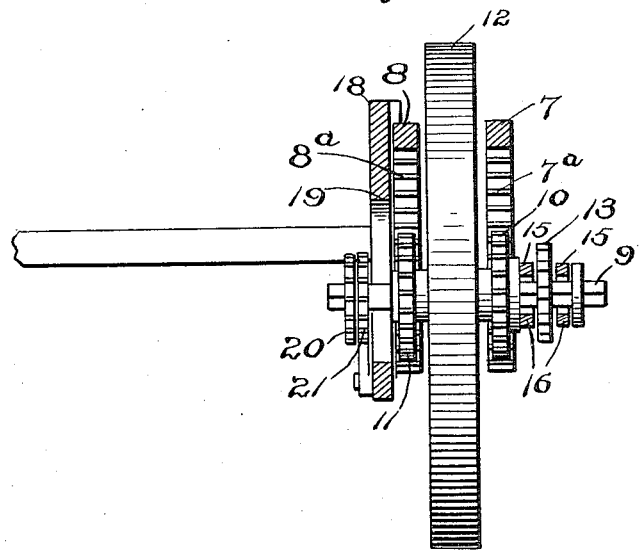
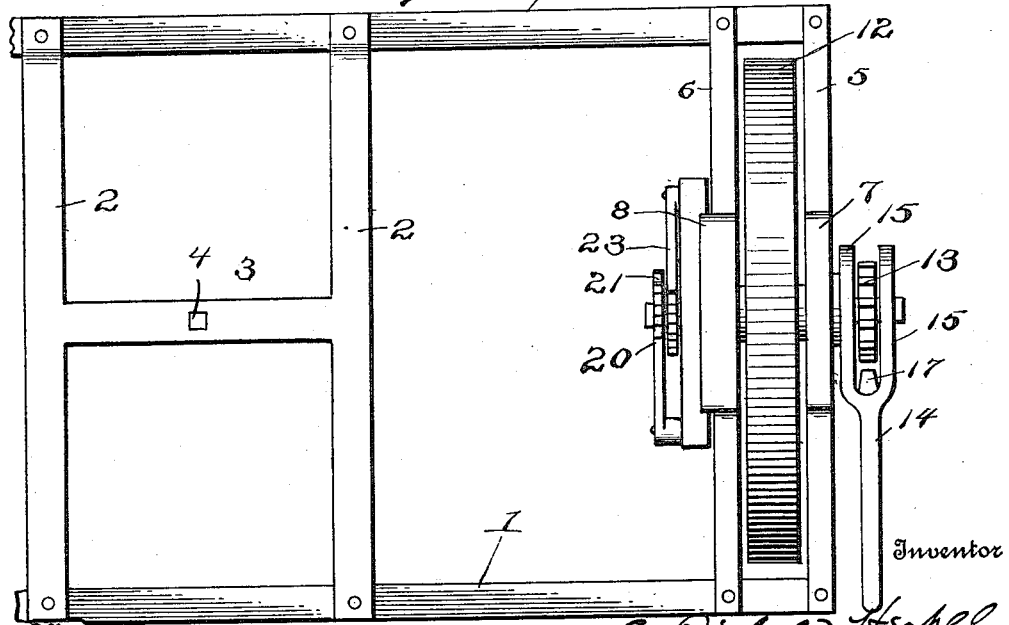

C. R. HERPEL.
WHEEL SETTING MECHANISM FOR HARVESTERS.
APPLICATION FILED JUNE 4, 1912.
1,075,148.
Patented Oct. 7, 1913.
2 SHEETS—SHEET 2.
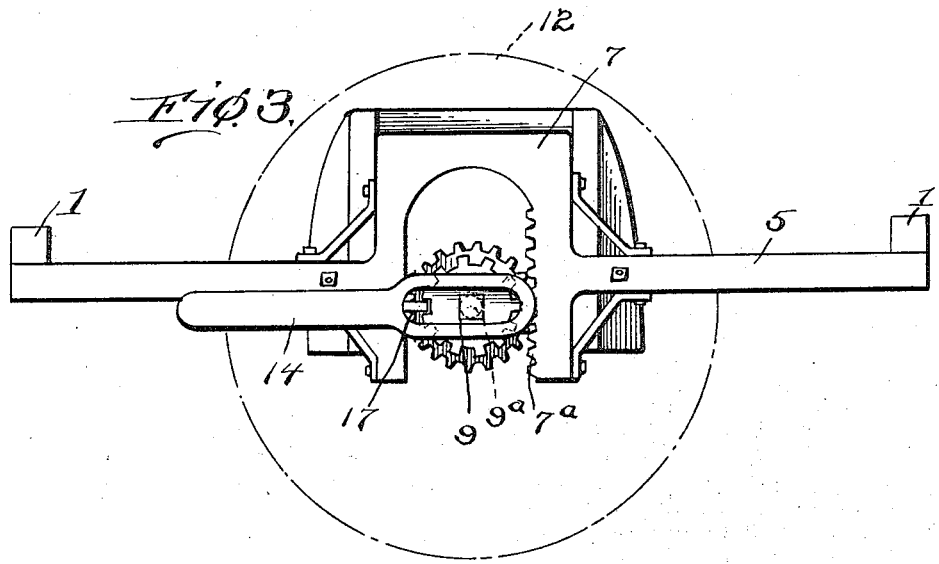
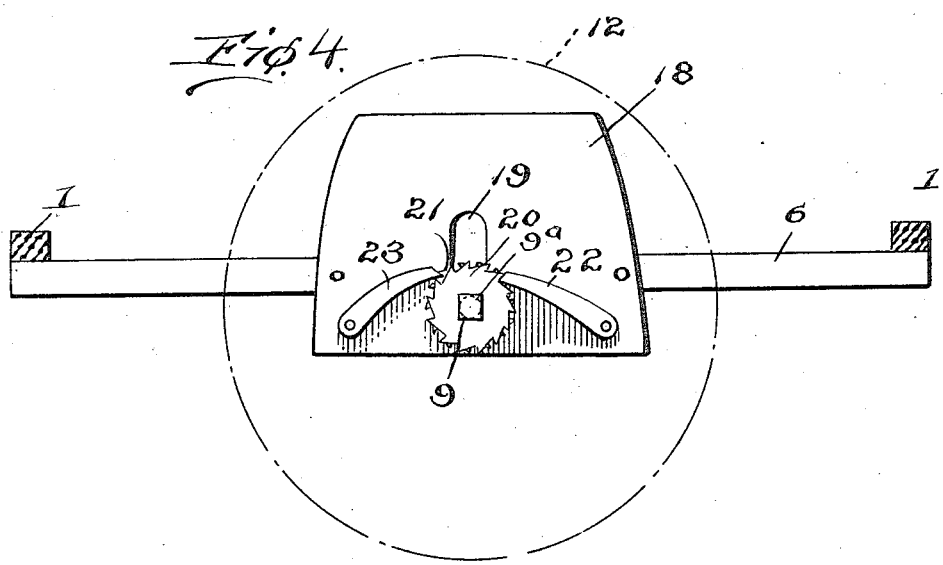

UNITED STATES PATENT OFFICE.

CARL RINHOLD HERPEL, OF NEWBURG, INDIANA.

WHEEL-SETTING MECHANISM FOR HARVESTERS.

1,075,148. Specification of Letters Patent. Patented Oct. 7, 1913.

Application filed June 4, 1912. Serial No. 701,527.

*To all whom it may concern:*

Be it known that I, CARL R. HERPEL, citizen of the United States, residing at Newburg, in the county of Warrick and State of Indiana, have invented certain new and useful Improvements in Wheel Setting Mechanism for Harvesters, of which the following is a specification.

My invention relates to devices for setting the wheels of grain separators and like machinery, to level the machine after being placed preliminary to operation thereof.

Heretofore in setting threshing machines, saw mills and the like, of a portable nature, it has been necessary to block up some of the wheels in order to level the machine for the most efficient operation thereof, and my invention has for its object the provision of means for adjusting the wheels of a threshing machine and other machinery of a like type, by which the inequalities of the ground may be overcome by setting the wheels relatively to the body of the machine to insure a level adjustment thereof.

My invention will be described in detail hereinafter and illustrated in the accompanying drawings, in which, Figure 1 is a plan view of one side of the front running gear of a traction engine constructed in accordance with my invention and having the wheel setting mechanism mounted thereon; Fig. 2, a cross section of the wheel setting mechanism, showing the wheel and part of the gearing in elevation;
Fig. 3, a side view of the running gear and wheel setting mechanism; and Fig. 4, a view of the other side of said wheel setting mechanism.

In the drawings similar reference characters will be used to designate corresponding parts in the several views.

In Fig. 1 is shown a plan view of a fragment of the running gear for the front of a traction wheel having the beams 1 that extend crosswise under the machine and connected by means of the cross bars 2 and a longitudinal bar 3 connecting said cross bars. The cross bar 3 is formed with an opening to receive a king pin 4 to pivotally secure the running gear to the threshing machine. Each end of the bars 1 are connected by means of cross bars 5, 6, it being understood that the other ends of the bars not shown in the drawings, have mounted thereon a construction similar to the construction shown in Fig. 1. The bars 5 and 6 are each provided intermediate of their ends with inverted U-shaped structures designated 7 and 8 respectively, having one of the legs of the U-shaped structure formed with rack teeth designated 7ª and 8ª respectively.

9 indicates a stub shaft having its ends formed rectangular in cross section as clearly shown in the drawings, and having pinions 10 and 11 mounted on said rectangular portions and meshing with the racks 7ª and 8ª respectively. The untoothed interior sides of the U-shaped structures 7 and 8 loosely engage the pinions 10 and 11, thus holding them in mesh with the racks 7ª and 8ª, respectively. The portion of the shaft 9 between the pinions 10 and 11 is formed circular in cross section as shown at 9ª and on said circular portion of the shaft is journaled a traction wheel 12.

13 designates a pinion mounted on the outer end of the shaft 9 and rotating therewith and 14 designates a lever having one of its ends bifurcated to inclose said pinion 13 as shown at 15, said bifurcated ends of the lever being provided with longitudinal slots 16 that slidably engage the shaft 9.

17 indicates a lug or projection extending from the lever 14 between the arms 15 of the bifurcated portion and adapted to engage the teeth of the pinion 13 when the lever 14 is moved toward said pinion and operating to turn said pinion 13 and with it the shaft 9 when it is desired to adjust the height of the shaft relative to the running gear heretofore described.

Secured to the cross bar 6 is a plate 18 having a slot 19 therein to receive the shaft 9 and to permit vertical movement of the shaft therein.

20 and 21 indicate ratchet wheels secured to the shaft 9 adjacent to the plate 18 and have their teeth extending in opposite directions as shown.

22 indicates a gravity pawl pivotally mounted on the plate 18 and engaging the teeth of the ratchet wheel 20, and 23 indicates a gravity pawl also pivotally mounted on the plate 18 and engaging the teeth of the ratchet wheel 21. It will be apparent that when the pawls 22 and 23 are in engagement with the teeth of the ratchet wheels 20 and 21 respectively, that the shaft 9 will be effectually held from rotation and the traction wheel 12 will be held immovable in a vertical direction relative to the running gear, but said traction wheel may obviously turn on the shaft 9, being journaled on the circular portion 9ª as heretofore described.

It will be apparent that when the device is in the position shown in the drawings that the threshing machine or other like device on which my invention may be mounted, may be transported from place to place.

When the machine is set up for operation, should it be found necessary to adjust the wheels thereof to overcome inequalities of the ground on which it may be placed, the shaft 9 may be moved vertically relative to the running gear by releasing the pawl 22 from the ratchet wheel 20 if it is desired to raise one side of the traction wheel to permit rotation of the shaft by means of the lever 14 engaging the pinion 13 as heretofore described. It will be apparent that when raising the threshing machine or other device, the lever 14 is swung upwardly and then moved inwardly toward the pinion 13 to permit the lug 17 to engage the teeth thereof and while in engagement with the pinion, the lever is again swung downwardly, thus rotating the shaft 9 and through the engagement of the pinions 10 and 11 with the gear racks 7ª and 8ª cause the shaft to proceed downwardly relatively to the running gear and in this manner, raise the side of the machine. When the machine is adjusted sufficiently, the pawl 22 is thrown over into engagement with the ratchet wheel 20 and the shaft 9 will be held from rotation. Should it be desired to lower the side of the machine, the pawl 23 is released from engagement with the ratchet wheel 21 and an operation opposite to that above described, will cause the shaft 9 to proceed upwardly relatively to the running gear and permit the side of the machine to be lowered.

While my device would work very well on light machinery when only one of the U-shaped structures was employed, I find that the use of two U-shaped structures, as heretofore described, is necessary in connection with heavy machinery, in order that the shaft 9 will move easily in a vertical direction, without tending to turn in a vertical plane.

Having thus described my invention, what I claim is:—

1. In a running gear for vehicles, a traction wheel, a stub axle upon which said wheel is journaled, a vertical rack bar, a pinion rigid with said axle and adapted for engagement with the rack bar, and means for rotating said axle, whereby the same may be raised or lowered with respect to said rack bar.

2. In a running gear of the character described, a traction wheel, a stub axle upon which said wheel is journaled, a pinion rigid with said axle, a rack bar engaged by said pinion, means for rotating the axle, whereby the same may be raised and lowered with respect to said rack bar, and means for locking the axle against rotation.

3. In a device of the character described, a running gear for wheeled vehicles having spaced-apart bars, inverted U-shaped portions intermediate of their ends, one of the legs of each of said U-shaped portions provided with a rack bar, a stub shaft, gear pinions secured to said stub shaft and meshing with said rack bars, a traction wheel journaled on said stub shaft, and means to rotate said shaft to adjust it relatively to said cross bars.

4. In a device of the character described, a running gear for wheeled vehicles, bars spaced apart, inverted U-shaped portions in said bars intermediate of their ends, one of the legs of each of said U-shaped portions being provided with a rack bar, a stub shaft, pinions secured to said stub shaft and meshing with said rack bars, the traction wheel journaled on said stub shaft, a pinion secured to said stub shaft, a lever having one of its ends bifurcated and the arms thereof formed with longitudinal slots slidably engaging the stub shaft, said arms of the bifurcated portion inclosing the last mentioned pinion, a lug extending from said lever between the arms of the bifurcated portion and adapted to engage between the teeth of said pinion, ratchet wheels secured to said stub shaft, the teeth of said ratchet wheels pointing in opposite directions, and pawls engaging said ratchet wheels.

5. In a device of the character described, a frame, traction wheels supporting the same, stub axles upon which said traction wheels are journaled, vertical rack bars rigid with the frame, pinions rigid with said axles, means for holding the pinions in engagement with the rack bars, levers for rotating said axles, and means for locking the axles against rotation.

6. A running gear of the character described, including a frame, traction wheels, stub axles upon which said traction wheels are journaled, U-shaped members rigid with the frame, each of said U-shaped members being formed along one leg with teeth, pinions rigid with the axles and adapted to mesh with said teeth, additional pinions also rigid with said axles, and means carried by the axles for engagement with said second mentioned pinion, whereby the axles may be rotated.

7. A running gear for vehicles, including a frame, a traction wheel, a stub axle on which said wheel is journaled, pinions rigidly secured to said axle upon opposite sides of the traction wheel, vertical rack bars rigidly secured to said frame upon one side of the axles, means for holding the pinions in engagement with the rack bars, an additional pinion also rigid with said axle, a lever carried by the axle and adapted to be moved into engagement with said last mentioned pinion, whereby the axle may be rotated, and means for locking said axle against rotation.

In testimony whereof I affix my signature in presence of two witnesses.

CARL RINHOLD HERPEL.

Witnesses:
 HELEN McCUTCHEON,
 JAMES T. WALKER.

Copies of this patent may be obtained for five cents each, by addressing the "Commissioner of Patents, Washington, D. C."